(12) United States Patent
Abe

(10) Patent No.: US 9,000,712 B2
(45) Date of Patent: Apr. 7, 2015

(54) SECONDARY BATTERY POWER CONTROL METHOD

(75) Inventor: Hiroyuki Abe, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 743 days.

(21) Appl. No.: 13/035,096

(22) Filed: Feb. 25, 2011

(65) Prior Publication Data

US 2011/0199042 A1 Aug. 18, 2011

Related U.S. Application Data

(63) Continuation of application No. PCT/JP2009/066609, filed on Sep. 25, 2009.

(60) Provisional application No. 61/101,165, filed on Sep. 30, 2008.

(51) Int. Cl.
| | |
|---|---|
| H02J 7/00 | (2006.01) |
| H01M 10/48 | (2006.01) |
| H01M 10/39 | (2006.01) |
| H01M 10/44 | (2006.01) |
| H02J 3/32 | (2006.01) |
| H02J 3/38 | (2006.01) |

(52) U.S. Cl.
CPC ........ *H01M 10/486* (2013.01); *H01M 10/3909* (2013.01); *H01M 10/443* (2013.01); *H02J 3/32* (2013.01); *H02J 3/386* (2013.01); *Y02E 70/30* (2013.01); *Y02E 10/763* (2013.01)

(58) Field of Classification Search
USPC .......................................................... 320/101
See application file for complete search history.

(56) References Cited

U.S. PATENT DOCUMENTS 6,481,406 B2 * 11/2002 Pels .............................. 320/136

(Continued)

FOREIGN PATENT DOCUMENTS

| JP | 10-174297 A1 | 6/1998 |
|---|---|---|
| JP | 11-233137 A1 | 8/1999 |

(Continued)

OTHER PUBLICATIONS

Japanese Office Action (Application No. 2010-531821) dated Jun. 3, 2014.

*Primary Examiner* — Edward Tso
*Assistant Examiner* — Robert Grant
(74) *Attorney, Agent, or Firm* — Burr & Brown, PLLC

(57) ABSTRACT

A secondary battery power control method controls power discharged from a secondary battery included in an interconnected system that supplies power to a power system, the interconnected system including a power generator that changes in output power, and an electric power storage-compensation device that includes a secondary battery, and a bidirectional converter that controls charging/discharging of the secondary battery, and compensates for a change in output power of the power generator. A temperature detection section that detects the temperature of the secondary battery is annexed to the secondary battery, and the maximum discharge power of the secondary battery is limited using the bidirectional converter when the temperature of the secondary battery detected by the temperature detection section has exceeded a preset temperature.

9 Claims, 3 Drawing Sheets

(56) References Cited

U.S. PATENT DOCUMENTS

| | | | |
|---|---|---|---|
| 6,532,425 B1* | 3/2003 | Boost et al. | 320/136 |
| 6,963,186 B2* | 11/2005 | Hobbs | 320/128 |
| 2003/0090238 A1* | 5/2003 | Wolin et al. | 320/150 |
| 2006/0214627 A1 | 9/2006 | Ito et al. | |
| 2008/0076010 A1* | 3/2008 | Sato | 429/61 |
| 2008/0076011 A1 | 3/2008 | Emori et al. | |
| 2008/0206626 A1 | 8/2008 | Tamakoshi et al. | |
| 2008/0224541 A1* | 9/2008 | Fukuhara | 307/48 |

FOREIGN PATENT DOCUMENTS

| | | |
|---|---|---|
| JP | 2001-136666 A1 | 5/2001 |
| JP | 2003-032804 A1 | 1/2003 |
| JP | 2003-317808 A1 | 11/2003 |
| JP | 2006-280043 A1 | 10/2006 |
| JP | 2007-185074 A1 | 7/2007 |
| JP | 2007-330017 A1 | 12/2007 |
| JP | 2008-084625 A1 | 4/2008 |
| JP | 2008-084677 A1 | 4/2008 |
| JP | 2008-210586 A1 | 9/2008 |

* cited by examiner

SECONDARY BATTERY POWER CONTROL METHOD

BACKGROUND OF THE INVENTION

1. Field of the Invention

The present invention relates to a secondary battery power control method for an interconnected system that supplies power to a power system, and includes a power generator (e.g., wind power generator) that changes in output power, and an electric power storage-compensation device that includes a sodium-sulfur battery.

2. Description of Related Art

In recent years, a natural-energy power generator that generates power by utilizing wind power, solar power, geothermal energy, or the like has attracted attention, and has been put to practical use. A natural-energy power generator is a clean power generator that utilizes an inexhaustible natural energy source instead of limited resources (e.g., petroleum), and can suppress carbon dioxide emissions. Therefore, various companies, autonomous bodies, and the like have increasingly employed a natural-energy power generator.

However, since the amount of natural energy obtained varies from hour to hour, a natural-energy power generator inevitably changes in output. This is an obstacle to widespread use of a natural-energy power generator. Therefore, when employing a natural-energy power generator, it is preferable to construct an interconnected (power generation) system by combining the natural-energy power generator with an electric power storage-compensation device that mainly includes a plurality of secondary batteries for preventing the obstacle.

In particular, a sodium-sulfur battery out of secondary batteries has a high energy density, achieves a high output within a short time, and exhibits a rapid response. Therefore, a sodium-sulfur battery may suitably be used to compensate for a change in output of a natural-energy power generator that may occur of the order of several hundred milliseconds to several seconds by utilizing a bidirectional converter that controls charging and discharging in combination with the sodium-sulfur battery. In other words, an interconnected system that includes a natural-energy power generator and an electric power storage-compensation device that includes a plurality of sodium-sulfur batteries is a desirable power generation system.

FIG. 3 is a graph showing a case of a change in power generated by a wind power generator and a planned value with respect to time when using an interconnected system that includes a wind power generator and an electric power storage-compensation device. As shown in FIG. 3, power generated by the wind power generator is stored in the power storage-compensation device in a time zone (1) (e.g., nighttime) in which power is not supplied to the power system. On the other hand, in a time zone (2) (e.g., daytime) power generated by the wind power generator is supplied to the power system, and power required to reach the planned value is discharged from the power storage-compensation device, and supplied to the power system. When using the interconnected system that includes the wind power generator and the power storage-compensation device, power output from the wind power generator changes every moment, as shown in FIG. 3. Therefore, the charging/discharging pattern of a secondary battery included in the power storage-compensation device also changes in order to absorb a change in output power.

No related art that has the same object as that of the present invention described later has been found. Patent Documents 1 and 2 disclose related technology, for example.

RELATED-ART DOCUMENT

Patent Document

Patent Document 1: JP-A-2003-317808
Patent Document 2: JP-A-2008-84677

SUMMARY OF THE INVENTION

When using an interconnected system that includes a power generator (e.g., wind power generator) that changes in output power, and an electric power storage-compensation device, the charging/discharging pattern of a secondary battery included in the power storage-compensation device changes, and a large amount of power may be continuously discharged depending on the power generation state of the wind power generator.

For example, when using a sodium-sulfur battery as the secondary battery, the internal temperature of the sodium-sulfur battery increases when a large amount of power is continuously discharged. The sodium-sulfur battery is normally maintained at about 300° C. using a heating means (e.g., heater). When the internal temperature of the sodium-sulfur battery has exceeded a given temperature (e.g., about 370° C.), it is necessary to compulsorily stop discharging the battery in order to protect the battery. However, since an interconnected system that includes a power generator and an electric power storage-compensation device is designed so that power required to reach the planned value is compensated for by discharging the power storage-compensation device, it is necessary to avoid compulsorily stopping discharging of the battery.

Even if the temperature of the sodium-sulfur battery has not increased to a value at which it is necessary to compulsorily stop discharging the battery, a deterioration in the sodium-sulfur battery is accelerated when the sodium-sulfur battery is continuously operated (discharged) at a high temperature. This may make it difficult to stably supply power from the interconnected system to the power system for a long time.

The present invention was conceived in view of the above problems. An object of the present invention is to provide a secondary battery power control method for efficiently operating an interconnected system that can stably supply power to a power system for a long time by suppressing a deterioration in the secondary battery.

The inventor of the present invention conducted extensive studies in order to achieve the above object. As a result, the inventor found that the above object can be achieved by annexing a temperature detection section that detects the temperature of the secondary battery to the secondary battery, and limiting the maximum discharge power of the secondary battery when the temperature of the secondary battery detected by the temperature detection section has exceeded a preset temperature. This finding has led to the completion of the present invention.

Specifically, the present invention provides the following secondary battery power control method.

[1] A method of controlling power discharged from a secondary battery that is included in an interconnected system, the interconnected system supplying power to a power system, and including a power generator that changes in output power, and an electric power storage-compensation device that includes the secondary battery, and a bidirectional converter that controls charging/discharging of the secondary battery, the power storage-compensation device compensating for a change in output power of the power generator, a temperature detection section that detects a temperature of the secondary battery being annexed to the secondary battery, the method comprising limiting maximum discharge power of the secondary battery using the bidirectional converter when the temperature of the secondary battery detected by the temperature detection section has exceeded a preset temperature.

[2] The method of controlling power discharged from a secondary battery according to [1], wherein a plurality of the preset temperatures are set so that the maximum discharge power of the secondary battery is gradually reduced as the temperature of the secondary battery increases.

[3] The method of controlling power discharged from a secondary battery according to [1] or [2], a limiter condition is transmitted from the temperature detection section to the bidirectional converter as digital information, the limiter condition being a condition whereby the maximum discharge power of the secondary battery is limited.

[4] The method of controlling power discharged from a secondary battery according to any one of [1] to [3], a limiter condition is transmitted from the temperature detection section to the bidirectional converter as analog information, the limiter condition being a condition whereby the maximum discharge power of the secondary battery is limited.

[5] The method of controlling power discharged from a secondary battery according to any one of [1] to [4], wherein the secondary battery includes a plurality of battery modules, each of the plurality of battery modules including a plurality of single cells, the temperature detection section is annexed to each of the plurality of battery modules, and a maximum temperature among temperatures detected by the temperature detection sections is extracted as the temperature of the secondary battery.

[6] The method of controlling power discharged from a secondary battery according to [5], an analog value of the extracted maximum temperature is transmitted from the temperature detection section to the bidirectional converter, and limiting the maximum discharge power of the secondary battery using the bidirectional converter based on the analog value of the maximum temperature transmitted to the bidirectional converter.

[7] The method of controlling power discharged from a secondary battery according to any one of [1] to [6], wherein the secondary battery is a sodium-sulfur battery.

[8] The method of controlling power discharged from a secondary battery according to any one of [1] to [7], wherein the power generator is a natural-energy power generator that utilizes at least one type of natural energy selected from wind power, solar power, and geothermal energy.

According to the method of controlling power discharged from a secondary battery of the present invention, the maximum discharge power of the secondary battery is limited using the bidirectional converter when the temperature of the secondary battery detected by the temperature detection section has exceeded a preset temperature. Therefore, the secondary battery is not continuously operated to a maximum extent at a high temperature. This makes it possible to stably supply power to a power system for a long time by suppressing a deterioration in the secondary battery. Moreover, since a situation in which it is necessary to compulsory stop discharging the secondary battery rarely occurs, power can be supplied to the power system while efficiently operating the interconnected system according to the method of controlling power discharged from a secondary battery.

DESCRIPTION OF THE INVENTION

Exemplary embodiments of the present invention are described below. Note that the present invention is not limited to the following embodiments. Various modifications and improvements may be appropriately made of the following embodiments based on the common knowledge of a person having ordinary skill in the art without departing from the scope of the present invention.

A secondary battery power control method according to the present invention controls power discharged from a secondary battery included in an interconnected system that supplies power to a power system, the interconnected system including a power generator that changes in output power, and an electric power storage-compensation device that includes a secondary battery, and compensates for a change in output power of the power generator. The term "secondary battery" used herein refers to a secondary battery that is defined in a secondary battery section divided by control sections. The number of single cells, the number of battery modules, the output, and the like of the secondary battery are not particularly limited. For example, when the secondary battery is a sodium-sulfur battery, and the sodium-sulfur battery forms the electric power storage-compensation device, one or a plurality of sodium-sulfur batteries controlled by a single bidirectional converter are collectively referred to as one "sodium-sulfur battery". All of the secondary batteries (sodium-sulfur batteries) desirably have an identical rated capacity, but need not necessarily have an identical rated capacity.

The term "output power" used herein may be simply referred to as "output".

Figure 1:
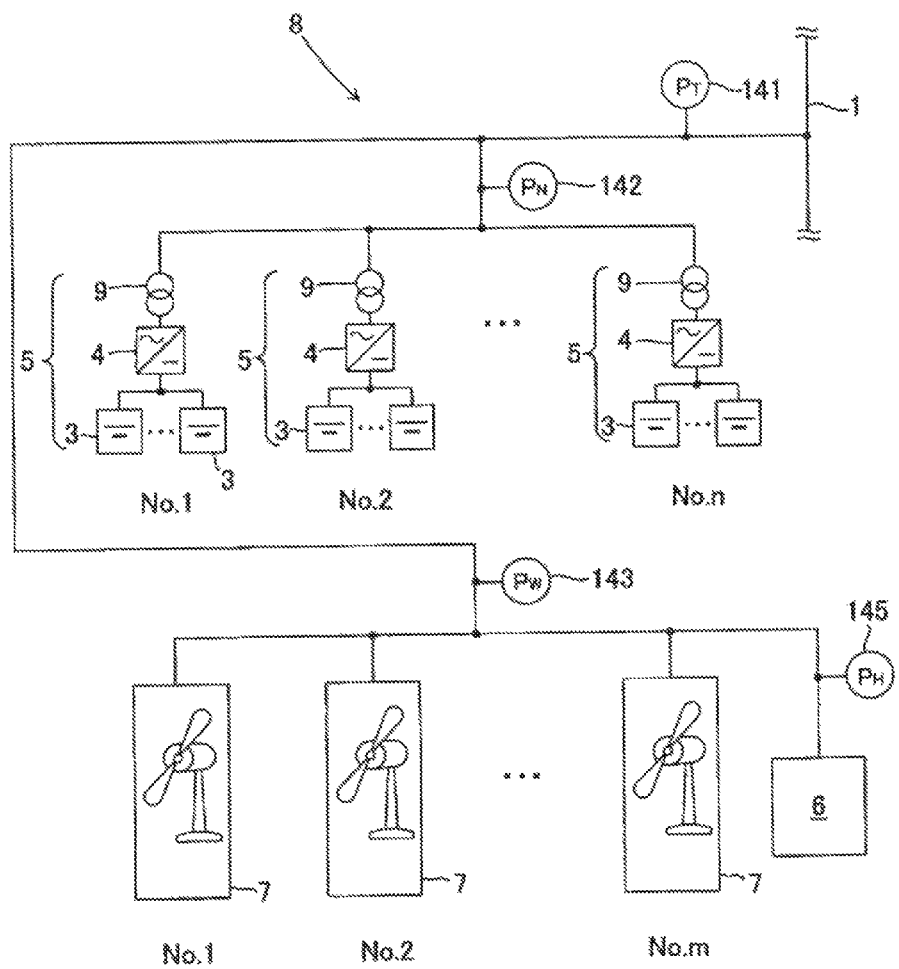
FIG. 1 is a system configuration diagram showing an example of an interconnected system that includes a power generator that changes in output, and an electric power storage-compensation device.

The interconnected system that supplies power to a power system is described below. FIG. 1 is a system configuration diagram showing an example of the interconnected system that includes the power generator that changes in output, and the electric power storage-compensation device. As shown in FIG. 1, an interconnected system 8 includes a wind power generator 7 (natural-energy power generator) that rotates blades by utilizing wind power to generate electricity, and an electric power storage-compensation device 5. The electric power storage-compensation device 5 includes a sodium-sulfur battery 3 which is a secondary battery that can store power, and can be charged and discharged, a bidirectional converter 4 having a dc/ac conversion function, and a transformer 9. The bidirectional converter 4 may include a chopper and an inverter, or may include an inverter, for example.

The interconnected system 8 includes m wind power generators 7 (No. 1 to No. m (m is an integer larger than one)), and n sodium-sulfur batteries 3 (power storage-compensation devices 5) (No. 1 to No. n (n is an integer larger than one)).

One or a plurality of sodium-sulfur batteries 3 included in a single power storage-compensation device 5 are collectively referred to as "sodium-sulfur battery 3 (or battery module)". An interconnected system normally further includes a private electric generator as power generator, and auxiliaries such as a heater for the sodium-sulfur battery as load. These elements are omitted in FIG. 1. In the secondary battery power control method according to the present invention, these auxiliaries and the like may be considered to be included in (added to or subtracted from) power generated by the power generator (wind power generator 7) that changes in output.

In the interconnected system 8, the electric power storage-compensation device 5 discharges the sodium-sulfur battery 3 such that power $P_N$ measured by a wattmeter 142 compensates for a change in power generated by the wind power generator 7 (power $P_W$ measured by a wattmeter 143 (including power $P_H$ that is consumed by an auxiliary 6 and measured by a wattmeter 145)). More specifically, discharging of the sodium-sulfur battery 3 (i.e., power $P_N$) is controlled so that power output from the interconnected system 8 (power $P_T$ measured by a wattmeter 141) satisfies "$P_T = P_W + P_N =$ constant ($P_N = P_T - P_W$)". This makes it possible to supply the power $P_T$ output from the whole interconnected system 8 (hereinafter may be referred to as "total power $P_T$") to a power system 1 (e.g., a power system between a distribution substation and a customer (consumer)) as stable and high-quality power. Note that the auxiliary 6 includes a heater for the sodium-sulfur battery 3, a control power supply, and the like.

In the interconnected system 8, the electric power storage-compensation device 5 charges the sodium-sulfur battery 3 based on a change in the power $P_W$ generated by the wind power generator 7. More specifically, controlling charge of sodium-sulfur battery 3 (i.e., power—$P_N$) so that the power $P_N$ measured by the wattmeter 142 satisfies $P_N = -P_W$ to consume power $P_W$ which is changing. This makes it possible to adjust the power $P_T$ output from the interconnected system 8 to zero.

When discharging or charging the sodium-sulfur battery 3, the electric power storage-compensation device 5 changes the controlled variable (control target value) of the bidirectional converter 4 based on the output (power $P_W$) from the wind power generator 7 so that power that compensates for a change in output (power $P_W$) from the wind power generator 7 is input or output. The sodium-sulfur battery 3 is thus charged or discharged, so that a change in output from the wind power generator 7 is absorbed. Since the interconnected system 8 can supply stable and high-quality power using the natural-energy power generator (wind power generator 7) and the sodium-sulfur battery 3 (power storage-compensation device 5) that cause only a small amount of carbon dioxide, the interconnected system 8 is a preferable power generation system.

Figure 2:
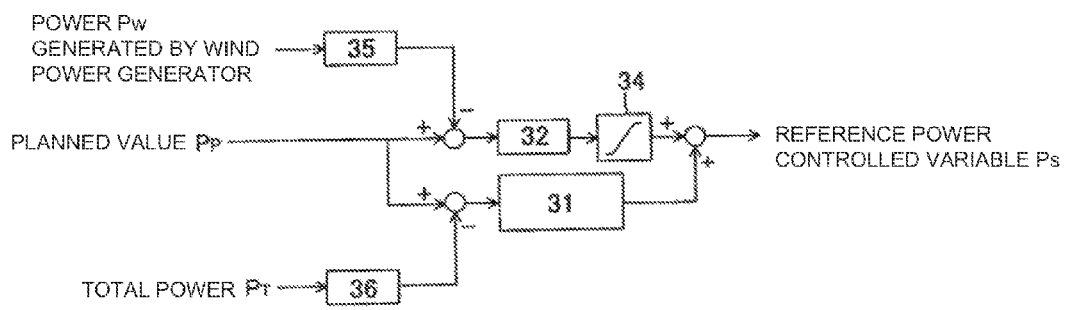
FIG. 2 is a block diagram showing a logic that determines a reference power controlled variable in an interconnected system with respect to the entire sodium-sulfur battery (power storage-compensation device).
Figure 3:
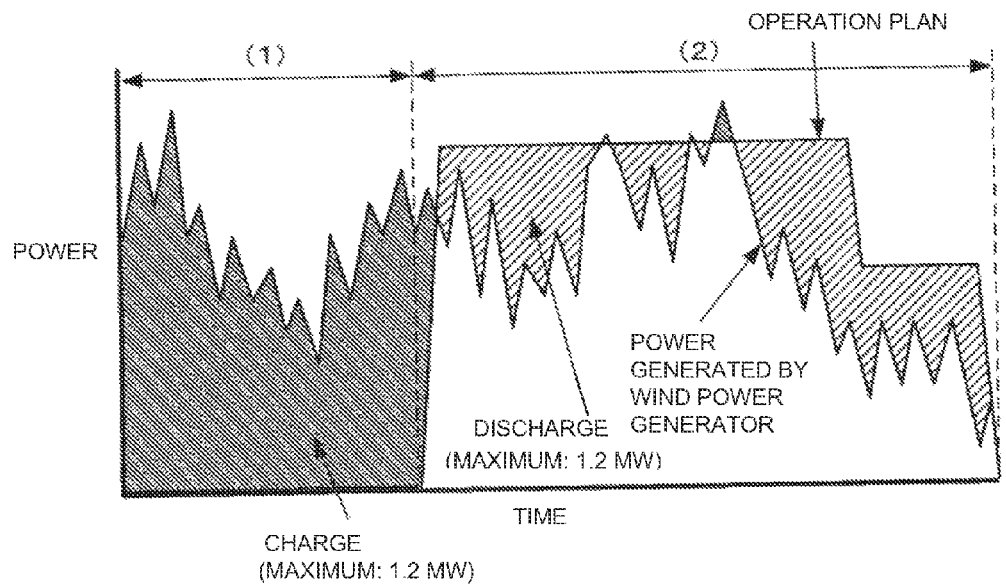
FIG. 3 is a graph showing an example of a change in power generated by a wind power generator and a planned value with respect to time when using an interconnected system that includes a wind power generator and an electric power storage-compensation device.

FIG. 2 is a block diagram showing a logic that determines a reference power controlled variable in the interconnected system with respect to the entire sodium-sulfur battery (power storage-compensation device). As shown in FIG. 2, a reference power controlled variable $P_s$ is calculated by adding a value obtained by subjecting a value calculated by subtracting the power $P_W$ generated by the wind power generator from a planned value $P_p$ to a proportional action by a proportioning controller 32 and a limiter action by a limiter 34 by a value equal to or larger than a preset value, to a value obtained by subjecting a value calculated by subtracting the current total power $P_T$ (when calculating the reference power controlled variable $P_s$) from the planned value $P_p$ to a proportional action and an integral action by a proportioning-integrating controller 31. The reference power controlled variable $P_s$ corresponds to the power that is charged to or discharged from all of the sodium-sulfur batteries in order to compensate for a change in output of the wind power generator.

Figure 4:
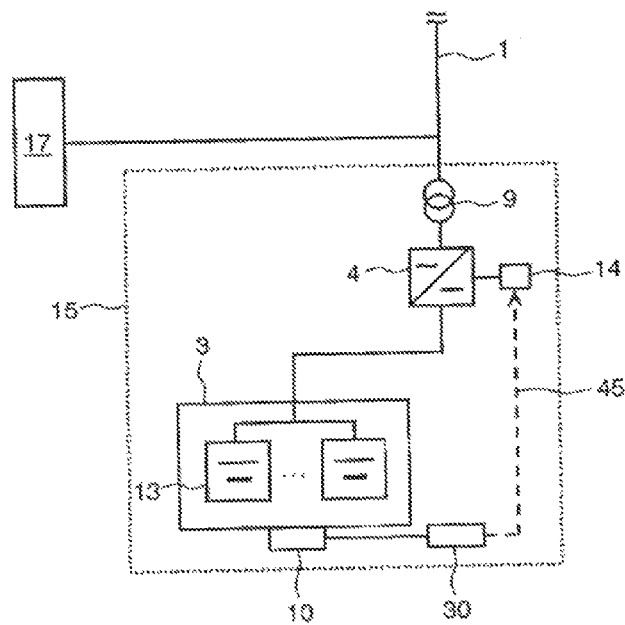
FIG. 4 is a system configuration diagram showing an example of an interconnected system used for a secondary battery power control method according to the present invention.

Next, the secondary battery power control method according to one embodiment of the present invention is described in detail below with reference to the drawings. FIG. 4 is a system configuration diagram showing an example of an interconnected system used for the secondary battery power control method according to one example of the present invention. The interconnected system shown in FIG. 4 includes a wind power generator 17, and an electric power storage-compensation device 15 that compensates for a change in output power of the wind power generator 17. The electric power storage-compensation device 15 includes a sodium-sulfur battery 3 (battery module 21), and a bidirectional converter 4 that controls charging/discharging of the sodium-sulfur battery 3. The sodium-sulfur battery 3 (battery module 21 see FIG. 5) includes a plurality of sodium sulfur batteries 13 that are connected in series-parallel.

A temperature detection section 10 that detects the temperature of the sodium-sulfur battery 13 is annexed to the sodium-sulfur battery 13. The temperature detection section 10 is provided at a position at which the temperature of the sodium-sulfur battery 13 and a change in temperature of the sodium-sulfur battery 13 can be substantially detected. The number of temperature detection sections 10 annexed to the sodium-sulfur battery 13 is not particularly limited.

When operating the interconnected system, the maximum discharge power of the sodium-sulfur battery 13 is limited using the bidirectional converter 4 when the temperature of the sodium-sulfur battery 13 detected by the temperature detection section 10 has exceeded a preset temperature. More specifically, information about the temperature of the sodium-sulfur battery 13 detected by the temperature detection section 10 is transmitted to a battery control section 30. The battery control section 30 determines a limiter condition 45 whereby the maximum discharge power of the sodium-sulfur battery 13 is limited. The limiter condition 45 thus determined is transmitted from the temperature detection section 10 and the battery control section 30 to a bidirectional converter control section 14. The bidirectional converter 4 operates to limit the maximum discharge power of the sodium-sulfur battery 13 based on the limiter condition 45.

The limiter condition 45 transmitted from the temperature detection section 10 (battery control section 30) to the bidirectional converter 4 (bidirectional converter control section 14) may be analog information, or may be digital information determined in advance corresponding to a preset temperature (e.g., limiter 1, limiter 2, . . . limiter n).

Table 1 shows a setting example of the maximum discharge power limiter with respect to the temperature (detected temperature) of the sodium-sulfur battery. The sodium-sulfur battery 13 is normally maintained at about 300° C. It is necessary to limit the maximum discharge power when the temperature of the sodium-sulfur battery 13 has exceeded 300° C. In Table 1, when the temperature of the sodium-sulfur battery 13 is 320° C. or less, the maximum discharge power is set to 120% (i.e., full output) with respect to the rated power (=100%). The maximum discharge power is gradually reduced by 20% at intervals of 10° C. when the detected temperature has exceeded 320° C. When the detected temperature has exceeded 360° C., discharge from the sodium-sulfur battery 13 is stopped in order to protect the sodium-sulfur battery 13.

TABLE 1

| Temperature (detected temperature) of sodium-sulfur battery | Maximum discharge power (output) limiter (rated power = 100%) |
|---|---|
| ≤320° C. | 120% |
| >320° C. | 100% |
| >330° C. | 80% |
| >340° C. | 60% |
| >350° C. | 40% |
| >360° C. | Stops discharge |

A deterioration in the sodium-sulfur battery 13 can be effectively suppressed while preventing a situation in which a rapid change occurs from a full output state to a compulsory discharge suspension state, by setting a plurality of preset temperatures so that the maximum discharge power of the sodium-sulfur battery 13 is gradually reduced as the detected temperature increases, as shown in Table 1. Therefore, power can be more stably supplied to the power system 1.

Figure 5:
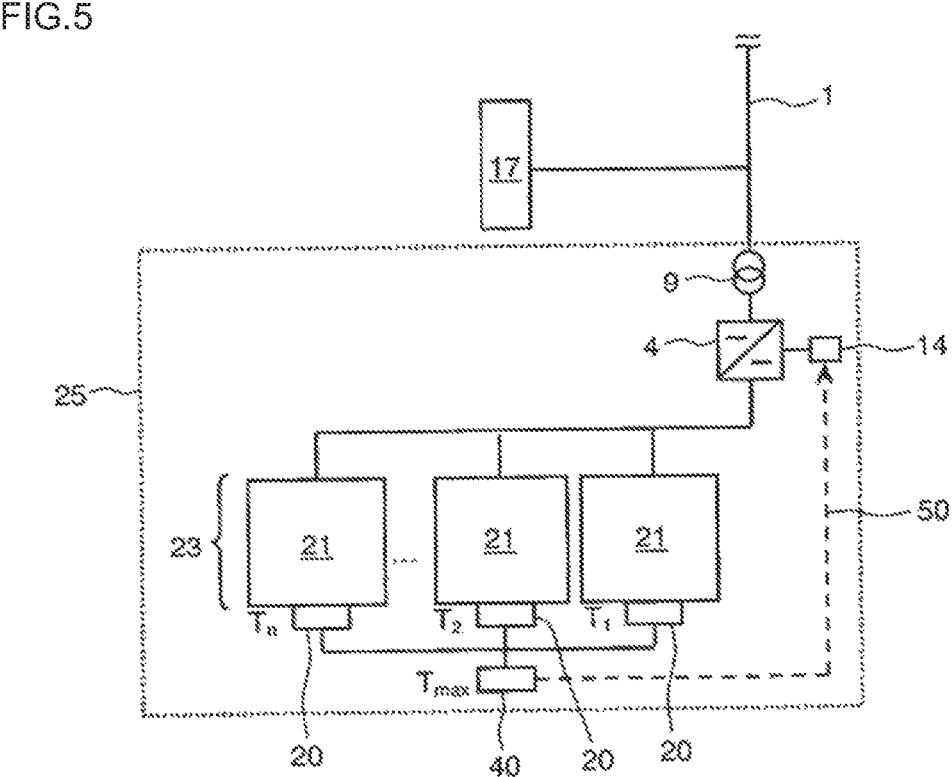
FIG. 5 is a system configuration diagram showing another example of an interconnected system used for a secondary battery power control method according to the present invention.

FIG. 5 is a system configuration diagram showing another example of the interconnected system used for the secondary battery power control method according to another example of the present invention. The interconnected system shown in FIG. 5 includes a wind power generator 17, and an electric power storage-compensation device 25. The electric power storage-compensation device 25 includes a sodium-sulfur battery 23, and a bidirectional converter 4 that controls charging/discharging of the sodium-sulfur battery 23. The sodium-sulfur battery 23 includes a plurality of battery modules 21. Each of the battery modules 21 includes a plurality of single cells that are connected in series-parallel.

A temperature detection section 20 is annexed to each of the battery modules 21. When operating the interconnected system, the maximum temperature ($T_{max}$) among the temperatures ($T_1, T_2, \ldots, T_n$) detected by the temperature detection sections 20 is extracted as the temperature of the sodium-sulfur battery 23, and the maximum discharge power of the sodium-sulfur battery 23 is limited using the bidirectional converter 4 when the extracted maximum temperature ($T_{max}$) has exceeded a preset temperature.

When the sodium-sulfur battery 23 includes a plurality of battery modules 21, a temperature distribution may occur depending on the arrangement and the operating conditions of the battery modules 21, the arrangement and the operating conditions of the single cells included in each battery module 21, and the like. The sodium-sulfur battery 23 can be finely operated depending on the actual temperature of the sodium-sulfur battery 23 by extracting the maximum temperature ($T_{max}$) as the temperature of the sodium-sulfur battery 23, and limiting the maximum discharge power of the sodium-sulfur battery 23 based on the maximum temperature ($T_{max}$).

The information ($T_1, T_2, \ldots, T_n$) about the temperature of the battery module 21 detected by the temperature detection sections 20 is transmitted to a battery control section 40. The battery control section 40 extracts the maximum temperature ($T_{max}$) from the detected temperatures ($T_1, T_2, \ldots, T_n$). It is preferable to transmit an analog value 50 of the extracted maximum temperature ($T_{max}$) from the battery control section 40 to a bidirectional converter control section 14, and limit the maximum discharge power of the sodium-sulfur battery 23 using the bidirectional converter 4 based on the analog value 50 of the maximum temperature ($T_{max}$). That is, the sodium-sulfur battery 23 can be finely operated depending on the power generation state of the natural-energy power generator that changes in output power every moment, by setting the condition (limiter condition) whereby the maximum discharge power of the sodium-sulfur battery 23 is limited to the bidirectional converter 4.

More specifically, it is possible to flexibly deal with various situations using the bidirectional converter 4, such as temporarily relaxing the limiter condition (increasing the maximum discharge power) depending on the power generation state of the power generator, or optionally adding a delay when setting the maximum discharge power limiter condition, for example.

The power generator included in the interconnected system to which the secondary battery power control method according to the present invention may suitably be applied, may be a natural-energy power generator that utilizes solar power, a natural-energy power generator that utilizes geothermal energy, or the like instead of a natural-energy power generator that utilizes wind power. A power generator that utilizes two or more types of natural energy selected from wind power, solar power, and geothermal energy may also be used.

INDUSTRIAL APPLICABILITY

The secondary battery power control method according to the present invention may be used as a method of controlling a secondary battery (e.g., sodium-sulfur battery) included in an electric power storage-compensation device that forms an interconnected system that supplies power to a power system, and includes a power generator that generates power using natural energy (e.g., wind power, solar power, or geothermal energy) and changes in output, and the electric power storage-compensation device.

EXPLANATION OF SYMBOLS

1: power system, 3, 23: sodium-sulfur battery, 4: bidirectional converter, 5, 15, 25: power storage-compensation device, 6: auxiliary, 7, 17: wind power generator, 8: interconnected system, 9: transformer, 10, 20: temperature detection section, 13: single cell sodium-sulfur battery, 14: bidirectional converter control section, 21: battery module, 30, 40: battery control section, 31: proportioning-integrating controller, 32: proportioning controller, 34: limiter, 35, 36: filter, 45: limiter condition, 50: analog value of maximum temperature ($T_{max}$), 141, 142, 143, 145: wattmeter

The invention claimed is:
1. A method of controlling power discharged from a secondary battery that is included in an interconnected system, the interconnected system supplying power to a power system, and including a power generator that changes in output power, an electric power storage-compensation device that includes the secondary battery, and a bidirectional converter that controls charging/discharging of the secondary battery, the electric power storage-compensation device compensating for a change in output power of the power generator, and
   a temperature detection section that detects a temperature of the secondary battery being annexed to the secondary battery,
   the method comprising limiting a maximum discharge power of the secondary battery by changing a control target value of the bidirectional converter when the temperature of the secondary battery detected by the temperature detection section has exceeded a preset tem- perature, wherein a delay is added when setting a maximum discharge power limiter condition, wherein the control target value depends on planned power output of the interconnected system, and wherein a plurality of the preset temperatures are set so that the maximum discharge power of the secondary battery is gradually reduced as the temperature of the secondary battery increases.

2. The method of controlling power discharged from a secondary battery according to claim 1, a limiter condition is transmitted from the temperature detection section to the bidirectional converter as digital information, the limiter condition being a condition whereby the maximum discharge power of the secondary battery is limited.

3. The method of controlling power discharged from a secondary battery according to claim 1, a limiter condition is transmitted from the temperature detection section to the bidirectional converter as analog information, the limiter condition being a condition whereby the maximum discharge power of the secondary battery is limited.

4. The method of controlling power discharged from a secondary battery according to claim 1, wherein the secondary battery includes a plurality of battery modules, each of the plurality of battery modules including a plurality of single cells, the temperature detection section is annexed to each of the plurality of battery modules, and a maximum temperature among temperatures detected by the temperature detection sections is extracted as the temperature of the secondary battery.

5. The method of controlling power discharged from a secondary battery according to claim 4, an analog value of the extracted maximum temperature is transmitted from the temperature detection section to the bidirectional converter, and limiting the maximum discharge power of the secondary battery using the bidirectional converter based on the analog value of the maximum temperature transmitted to the bidirectional converter.

6. The method of controlling power discharged from a secondary battery according to claim 1, wherein the secondary battery is a sodium-sulfur battery.

7. The method of controlling power discharged from a secondary battery according to claim 1, wherein the power generator is a natural-energy power generator that utilizes at least one type of natural energy selected from wind power, solar power, and geothermal energy.

8. The method of controlling power discharged from a secondary battery according to claim 2, wherein the secondary battery includes a plurality of battery modules, each of the plurality of battery modules including a plurality of single cells, the temperature detection section is annexed to each of the plurality of battery modules, and a maximum temperature among temperatures detected by the temperature detection sections is extracted as the temperature of the secondary battery.

9. The method of controlling power discharged from a secondary battery according to claim 3, wherein the secondary battery includes a plurality of battery modules, each of the plurality of battery modules including a plurality of single cells, the temperature detection section is annexed to each of the plurality of battery modules, and a maximum temperature among temperatures detected by the temperature detection sections is extracted as the temperature of the secondary battery.

* * * * *